No. 618,323. Patented Jan. 24, 1899.
B. E. BENGTSON.
FLUE STOPPER.
(Application filed June 27, 1898.)
(No Model.)

WITNESSES:

INVENTOR
B. E. Bengtson
BY
ATTORNEYS.

THE NORRIS PETERS CO., PHOTO-LITHO., WASHINGTON, D. C.

UNITED STATES PATENT OFFICE.

BERNDT E. BENGTSON, OF AXTELL, NEBRASKA, ASSIGNOR OF ONE-HALF TO JOHN D. ENGLAND, OF SAME PLACE.

FLUE-STOPPER.

SPECIFICATION forming part of Letters Patent No. 618,323, dated January 24, 1899.

Application filed June 27, 1898. Serial No. 684,567. (No model.)

*To all whom it may concern:*

Be it known that I, BERNDT E. BENGTSON, of Axtell, in the county of Kearney and State of Nebraska, have invented a new and Improved Flue-Stopper, of which the following is a full, clear, and exact description.

The object of my invention is to provide a flue-stopper of exceedingly simple, durable, and economic construction and which may be expeditiously and conveniently entered into the thimble and expanded from the outside to such an extent that the passage through the thimble will be effectually closed, preventing the egress of soot, sparks, smoke, fire, or water, and whereby, further, the cover for the flue-opening will be brought in positive and smooth engagement with the outer face of the wall in which the flue-opening is made.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
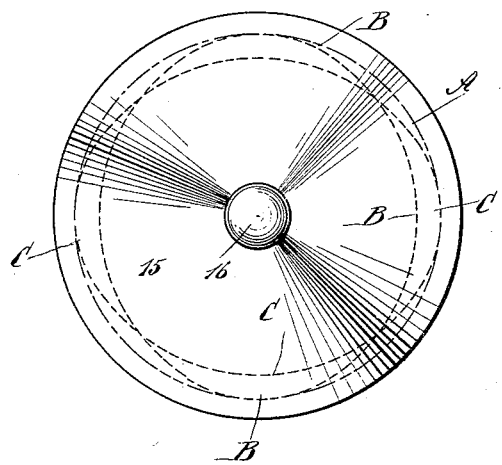
Figure 2:
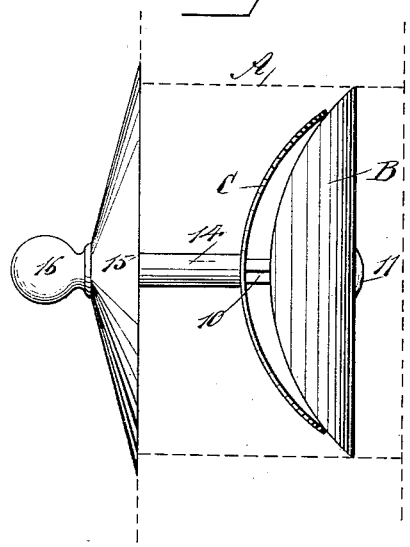
Figure 3:
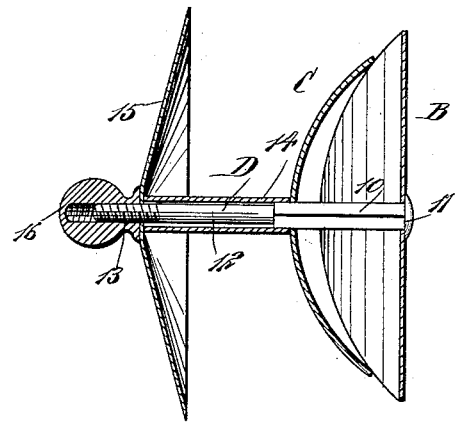

Figure 1 is a front elevation of the improved device. Fig. 2 is a side elevation thereof, and Fig. 3 is a longitudinal central section through the device.

A represents a thimble such as is ordinarily placed in flue-openings, and B and C represent two oval plates which are transversely curved, and D represents a bolt adapted to be passed through the said plates. The plates B and C are placed one against the other in such manner that their concaved faces will be opposite, and the said plates are furthermore so arranged that one will extend transversely of the other, as shown in dotted lines in Fig. 1. Thus the end portions of one plate will extend beyond the side portions of the other plate.

The bolt D is provided with a head 11 and a portion 10 adjacent to the head, which is usually polygonal in cross-section, the polygonal portion of the bolt being of sufficient length to pass through the two plates B and C, each of the plates being provided with a central opening for the bolt corresponding in cross-section to the cross-sectional shape of the portion 10 of the bolt. The remaining portion 12 of the bolt is usually circular in cross-section, and the end opposite the head 11 is provided with a thread 13. A sleeve 14 is loosely fitted on the bolt D, one end of the said sleeve being brought to an engagement with the convexed surface of the outermost oval plate C, as is particularly shown in Fig. 3. A cap or a cover plate 15 is provided, the said cap or cover plate having an opening in its center, through which the threaded portion 13 of the bolt may be passed, and a nut 16 is screwed upon the outer threaded end 13 of the bolt, the said nut having a bearing against the central portion of the cap or cover plate 15, as is also particularly shown in Fig. 3.

In operation the nut 16 is loosened, and the oval plates B and C are introduced into the thimble A until the cap or cover plate 15 engages with the outer face of the wall in which the flue-opening is made. The nut 16 is then screwed on the bolt 12 in a manner to exert pressure on the cap or cover plate and on the sleeve 14, and the sleeve 14, having bearing against the outer oval plate C, will cause that plate to expand, and the outer oval plate having engagement with the inner oval plate B will cause the latter to expand proportionately, and since the expansion of the two plates B and C is limited in the direction of their length on the thimble A the two plates B and C when expanded as much as possible will conjointly act to completely close the thimble and prevent any soot or other matter liable to be discharged from a chimney from passing out through the thimble, while at the same time the cap or cover plate will be held firmly in engagement with the wall and the outlet of the flue-opening be completely closed and concealed.

It will be understood that the cap or cover plate 15 may be of any desired shape or configuration. I furthermore desire it to be understood that the head of the bolt D may be received in the nut 16 and that the threaded end of the bolt may be made to screw into the innermost oval stop-plate B, or it may be simply a screw which is turned by a screwdriver or other tool.

Having thus described my invention, I claim as new and desire to secure by Letters Patent—

1. A flue-stopper, consisting of curved plates placed one upon the other, their concaved surfaces facing, a cap or cover plate, a connection between the cap or cover plate and the opposing curved plate, a guide device secured to the curved plates extending through the cover-plate, and means, substantially as described, for forcing the cover-plate in direction of the curved plates, whereby the latter may be expanded, as set forth.

2. A flue-stopper, consisting of two curved oval plates placed transversely upon each other with their concaved surfaces facing, a cover or cap plate, a sleeve extending from the cover or cap plate to the uppermost oval plate, and means, substantially as described, for forcing the cover-plate toward the curved plates and for guiding the plates in their movement, substantially as and for the purpose specified.

3. A flue-stopper consisting of two oval transversely-curved plates, the said plates being placed transversely of each other with their concaved surfaces facing, a cap or cover plate, a sleeve extending from the cap or cover plate to an engagement with the outermost oval plate, a bolt having a polygonal section which extends through the oval plates and a threaded section which extends through the cover-plate, a nut located on the threaded section of the bolt, adapted for engagement with the cover-plate, and a sleeve loosely mounted around the bolt, engaging with the cover-plate and the outermost oval plate, for the purpose set forth.

BERNDT E. BENGTSON.

Witnesses:
B. J. HALLBERRY,
OLA PETERSON.